(12) United States Patent
Black et al.

(10) Patent No.: US 7,450,943 B2
(45) Date of Patent: Nov. 11, 2008

(54) METHOD AND APPARATUS FOR DETERMINING COVERAGE AND SWITCHING BETWEEN OVERLAY COMMUNICATION SYSTEMS

(75) Inventors: Peter J. Black, San Diego, CA (US); Ramin Rezaiifar, San Diego, CA (US); Thunyachate Ekvetchavit, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 10/366,101

(22) Filed: Feb. 12, 2003

(65) Prior Publication Data

US 2004/0157610 A1  Aug. 12, 2004

(51) Int. Cl.
*H04Q 7/20* (2006.01)
(52) U.S. Cl. .................. 455/436; 455/422.1; 455/552.1
(58) Field of Classification Search .............. 455/414.1, 455/417, 421, 422.1, 436–439, 440, 525, 455/550.1, 552.1, 553.1, 168.1, 42.3, 67.11; 370/332, 252, 345
See application file for complete search history.

(56) References Cited

U.S. PATENT DOCUMENTS

| | | | |
|---|---|---|---|
| 5,640,414 A | | 6/1997 | Blakeney, II et al. |
| 5,940,762 A | * | 8/1999 | Lee et al. .................... 455/442 |
| 6,021,123 A | * | 2/2000 | Mimura ....................... 370/331 |
| 7,016,323 B2 | * | 3/2006 | Yun et al. .................... 370/331 |
| 7,016,331 B1 | * | 3/2006 | Joo et al. ..................... 370/334 |
| 7,068,626 B2 | * | 6/2006 | Zeira et al. ................... 370/332 |
| 7,171,216 B1 | * | 1/2007 | Choksi .................... 455/456.1 |
| 2002/0197992 A1 | * | 12/2002 | Nizri et al. ................... 455/435 |

FOREIGN PATENT DOCUMENTS

| | | |
|---|---|---|
| EP | 1115261 A1 | 7/2001 |
| WO | 9628947 | 9/1996 |
| WO | 98/27777 | 6/1998 |
| WO | 0054540 | 9/2000 |

OTHER PUBLICATIONS

International Search Report PCT/US2004/004601, International Search Authority-EPO, Jul. 20, 2004.

* cited by examiner

*Primary Examiner*—Jean A Gelin
(74) *Attorney, Agent, or Firm*—Thomas R. Rouse; Kristine U. Ekwueme

(57) ABSTRACT

Techniques to determine whether or not a terminal is under the coverage of a current wireless communication system (e.g., a packet data system) and to switch from the current system to another wireless communication system (e.g., a voice/data system). In one method, at least one measurement of at least one parameter for at least one base station in the current system is initially obtained. The measurement(s) may be SNR measurements. A metric is derived based on the measurement(s) and used (typically along with a metric threshold and a timer) to determine whether or not the terminal is within the coverage of the current system. A switch to another system is initiated if the terminal is deemed to be outside the coverage of the current system. The two systems provide at least one common service (e.g., packet data service).

38 Claims, 5 Drawing Sheets

METHOD AND APPARATUS FOR DETERMINING COVERAGE AND SWITCHING BETWEEN OVERLAY COMMUNICATION SYSTEMS

BACKGROUND

I. Field

The present invention relates generally to communication, and more specifically to techniques for determining coverage for a terminal and switching between overlay communication systems.

II. Background

Wireless communication systems are widely deployed to provide various types of communication such as voice, packet data, and so on. These systems may be multiple-access systems capable of supporting communication with multiple users by sharing the available system resources. Examples of such multiple-access systems include code division multiple access (CDMA) systems, time division multiple access (TDMA) systems, and frequency division multiple access (FDMA) systems. A CDMA system may be designed to implement one or more standards such as IS-2000, IS-856, IS-95, W-CDMA, and so on. A cdma2000 system is a CDMA system that may implement IS-2000 and/or IS-856. A TDMA system may be designed to implement one or more standards such as Global System for Mobile Communications (GSM) and so on. A GSM system may implement General Packet Radio Service (GPRS) for packet data transmission. These various standards are well known in the art.

Some communication systems (e.g., such as those that implement IS-2000 W-CDMA, and GSM/GPRS) are capable of supporting voice and packet data services. Each type of service is characterized by a set of requirements. For example, voice service typically requires a fixed and common grade of service (GOS) for all users as well as relatively stringent and fixed delays. In contrast, packet data service may be able to tolerate different GOS for different users and may further be able to tolerate variable amounts of delays. To support both types of service, a communication system may first allocate system resources to voice users and then allocate any remaining system resources to packet data users whom can tolerate longer delays.

Some communication systems (e.g., such as those that implement IS-856) are optimized for packet data transmission, which is typically characterized by long periods of silence punctuated by large bursts of traffic. For an IS-856 system, a large portion of the system resources may be allocated to one user at a time, thereby greatly increasing the peak data rate for the user being served.

A service provider/network operator may deploy multiple communication systems to provide enhanced services for its subscribers. For example, a service provider may deploy one system capable of supporting both voice and packet data services for a large geographic area and may deploy another system capable of supporting packet data service for "hot spots" where packet data usage is expected to be high. The coverage areas of the two systems would typically overlap at least partially, and these systems would then be considered as "overlay" systems. A multi-mode/hybrid terminal may be able to receive service from one of the systems depending on its location and the desired service. Some of the challenges in such overlay systems include (1) determining the coverage bounds of the individual systems and (2) deciding when a terminal should switch between the systems.

There is therefore a need in the art for techniques to determine coverage for a terminal and to switch between overlay communication systems.

SUMMARY

Techniques are provided herein to determine whether or not a terminal is under the coverage of a current system (e.g., a packet data system) and to switch from the current system to another system (e.g., a voice/data system) if and when appropriate. Various schemes to determine coverage and to switch between multiple overlay systems may be implemented based on a metric, a metric threshold, a timer, other factors, or a combination thereof.

The metric may be a parameter or a function of one or more parameters. An exemplary parameter is signal quality, which may be quantified by a signal-to-noise ratio (SNR). An exemplary metric is a Switch metric that is a function of SNRs of signals (e.g., pilots) received from base stations in one or more sets (e.g., selected from an active set, a candidate set, and a neighbor set described below).

The metric threshold may be a fixed value or an adaptive value that is dependent on operating condition. The metric threshold is selected such that (1) the coverage bounds of the current system may be accurately determined and/or (2) the terminal does not switch from the current system too early or too late. The timer may be used to provide hysteresis so that (1) the terminal does not intermittently indicate that it is within/outside the coverage of the current system and (2) an out-of-coverage indication; is not erroneously declared too frequently because of noisy measurements. The timer may be for a fixed duration or a variable duration that is dependent on operating condition.

In one specific method of switching a terminal from a first communication system to a second communication system, at least one measurement of at least one parameter for at least one base station in the first communication system is initially obtained. The at least one measurement may be SNR measurements. A metric is then derived based on the at least one measurement and is used (typically along with a metric threshold and a timer) to determine whether or not the terminal is within the coverage of the first communication system. A switch to the second communication system is initiated if the terminal is deemed to be outside the coverage of the first communication system.

The first and second communication systems provide at least one common service (e.g., packet data service). The first system may be, e.g., an IS-856 system, and the second system may be, e.g., an IS-2000 system. The switch from the first system to the second system may be based on one switching scheme, and the switch from the second system back to the first system may be based on another switching scheme. Two different switching schemes may be used, for example, if the coverage areas of the first and second systems are different.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The techniques described herein may be used for various communication systems, such as IS-2000, IS-856, IS-95, W-CDMA, and GSM systems. These techniques may be used for multiple (e.g., two) communication systems that (1) have coverage areas that overlap at least partially and (2) provide a common service (e.g., packet data) that can tolerate possible disruption in service. As an example, one of the systems may be a IS-2000 system (also commonly referred to as a "1×" system) that may provide voice and packet data services, and other one of the systems may be an IS-856 system (also commonly referred to as a "1×EV-DO" system) that may provide packet data service. For clarity, these techniques are described below for a voice/data system and a packet data system. The voice/data system may be, e.g., an IS-2000, W-CDMA, or GSM/GPRS system, and the packet data system may be, e.g., an IS-856 system.

Figure 1:
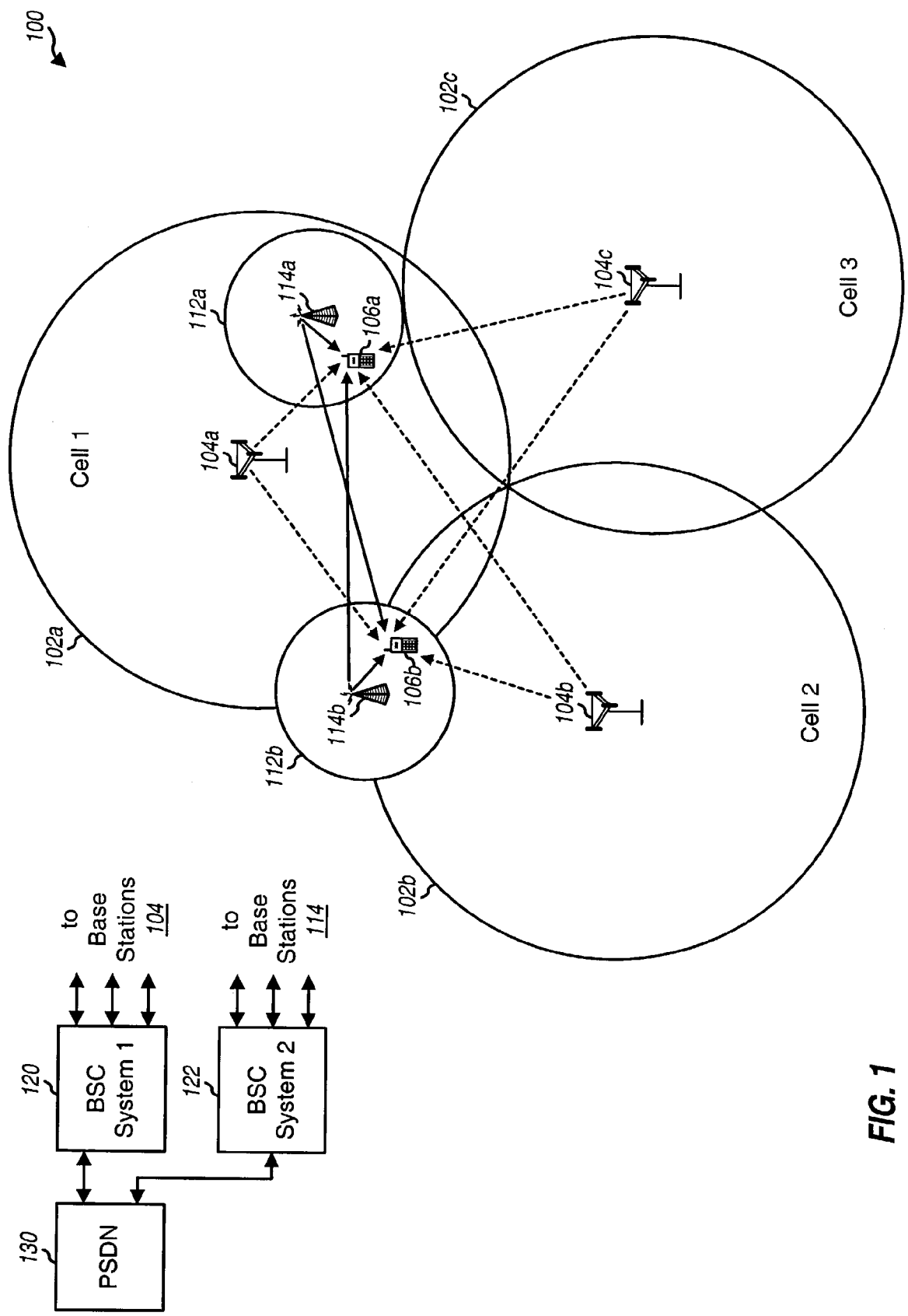
FIG. 1 shows an exemplary deployment whereby a packet data system overlays a voice/data system.

FIG. 1 shows a diagram of an exemplary deployment 100 whereby a packet data system overlays a voice/data system. The voice/data system may be deployed to provide voice/packet data coverage for a large geographic area. The packet data system may be deployed to provide packet data coverage for "hot spots", which are areas where packet data usage is expected to be high.

The voice/data system includes a number of base stations 104 that may provide voice and packet data services for mobile stations located within coverage areas 102 of these base stations. Similarly, the packet data system includes a number of base stations 114 that may provide packet data service for access terminals located within coverage areas 112 of these base stations. For simplicity, only few base stations 104 and 114 and mobile stations/access terminals 106 are shown in FIG. 1. Base stations 104 and 114 may be located at different sites (as shown in FIG. 1) or co-located at the same sites. As also shown in FIG. 1, the coverage area of the packet data system may not be contiguous and may be isolated islands within and/or overlapping the coverage area of the voice/data system.

Base stations 104 couple to a base station controller (BSC) 120 that provides coordination and control for these base stations. Similarly, base stations 114 couple to a BSC 122 that provides coordination and control for these base stations. BSCs 120 and 122 further couple to packet data serving node (PDSN) 130 that supports packet data service for both the voice/data system and the packet data system.

In general, the base stations are fixed stations for communicating with the mobile stations and access terminals. The fixed stations may also be referred to as base transceiver systems, access points, Node Bs, or some other terminology. The mobile stations and access terminals communicate with the fixed stations and may also be referred to as remote stations, wireless communication devices, user equipment (UE), or some other terminology. For simplicity, the terms "base stations" and "terminals" are A used for the fixed stations and the devices that communicate with the fixed stations, respectively, in the description below.

Each terminal may communicate with one or multiple base stations on the forward link and/or reverse link at any given moment. The forward link (i.e., downlink) refers to the communication link from the base station to the terminal, and the reverse link (i.e., uplink) refers to the communication link from the terminal to the base station. A terminal may communicate concurrently with multiple base stations if soft handoff is supported. For example, IS-2000 and W-CDMA support soft handoff for the forward and reverse links, and IS-856 supports soft handoff for the reverse link but not the forward link.

The terminals may be mobile and may move throughout the coverage areas of the voice/data system and the packet data system. To provide enhanced services, it is highly desirable for a terminal to be able to accurately determine the coverage bounds of these systems and to smoothly switch between these systems when appropriate. For example, a terminal may be in communication with the packet data system. If the terminal is moving and reaches the edge of the coverage area of the packet data system, then it is desirable for the terminal to switch to the voice/data system so that it may continue to receive service. The switch should not occur too early because leaving the more efficient packet data system when not necessary may result in some loss in performance for packet data transmission. The switch should also not occur too late because leaving the packet data system after conditions become deteriorated may also result in degraded performance.

The techniques described herein may provide a smooth transition between multiple systems. In an aspect, techniques are provided to determine the coverage bounds of the current system (e.g., the packet data system). In another aspect, techniques are provided to switch between these systems, a process that is also referred to as reselection. These techniques are described in detail below.

The coverage bounds of a wireless communication system may be determined in various manners. As noted above, it is highly desirable to accurately determine the coverage bounds of the packet data system so that a terminal does not switch from the packet data system to the voice/data system too early or too late. Moreover, the coverage bound determination should be based on parameters that are readily available so that implementation is simplified.

A parameter that is often used to determine coverage bounds is SNR, which is a measure of received signal quality. The SNR of a signal received at a terminal is typically obtained by measuring the strength of a pilot included in the received signal. A pilot is a reference signal that is generated based on a known data pattern and processed in a known manner. SNR may also be given as an energy-per-chip-to-total-noise-and-interference ratio ($E_c/I_o$). SNR, pilot signal strength, and $E_c/I_o$ are thus synonymous terms that are used to denote signal quality and which may be used interchangeably. The SNR of a signal received from a base station may be used to estimate the condition of the communication link to that base station.

Conventionally, the coverage bounds of a CDMA system are determined based on the signal strength of pilots received from base stations in the system and a set of Add and Drop thresholds. Each terminal maintains an active set that includes all base stations from which the terminal receives pilots of sufficient signal strength. A base station is added to the active set if its pilot signal strength exceeds the Add threshold. Conversely, a base station is removed from the active set if its pilot signal strength falls below the Drop threshold. A terminal is deemed to be within the coverage of the system if there is at least one base station in the active set (i.e., the active set is not empty).

Conventionally, the Add threshold is selected to be higher than the Drop threshold to provide hysteresis. The hysteresis prevents a base station from being intermittently added to and removed from the active set due to fluctuations in pilot signal strength measurements. The measurement fluctuations result from noise and changes in the communication link. However, if the Add threshold is higher than the Drop threshold, then the coverage area observed by a terminal entering the system is smaller than the coverage area observed by the terminal leaving the system. This is because when entering the system, the terminal is deemed to be within the coverage of the system when the signal strength of at least one pilot is above the (higher) Add threshold. In contrast, when leaving the system, the terminal is deemed to be outside the coverage of the system if the signal strength of no pilot is above the (lower) Drop threshold. If this conventional method is used to determine the coverage bounds of the packet data system, then the terminal may switch from the packet data system to the voice/data system too late because of the larger coverage area observed by the terminal when leaving the packet data system.

In a first scheme for determining coverage bounds and/or switching between systems, whether or not a terminal is within the coverage of a system is determined based on a Switch metric that is computed based on the SNR of signals (e.g., pilots) received by the terminal. A terminal may maintain multiple sets of base stations in different categories. For example, for an IS-856 system, each terminal may maintain the following sets:

- active set (ASET)—includes base stations from which the terminal may request data transmission on the forward link;
- candidate set (CSET)—includes base stations whose pilots are received by the terminal with sufficient SNR but are not included in the active set; and
- neighbor set (NSET)—includes base stations advertised by the system to be neighbors of the base stations in the active set.

The Switch metric may be defined in various manners. In one embodiment, the Switch metric is defined as follows:

$$\text{Switch metric} = \text{Sum of } E_c/I_o \text{ of all pilots in the active and candidate sets} + \text{Max}\{E_c/I_o \text{ of pilots in the neighbor set}\}, \quad \text{Eq (1)}$$

where $E_c/I_o$ is indicative of SNR. This embodiment gives preference to base stations in the active and candidate sets in the computation of the Switch metric.

In another embodiment, the Switch metric is defined as follows:

$$\text{Switch metric} = \text{Max}\{E_c/I_o \text{ of pilots in the active, candidate, and neighbor sets}\}. \quad \text{Eq (2)}$$

This embodiment equally considers all base stations in the active, candidate, and neighbor sets in the computation of the Switch metric.

In yet another embodiment, the Switch metric is defined as follows:

$$\text{Switch metric} = \text{Sum of } E_c/I_o \text{ of all pilots in the active set} + \text{Max}\{E_c/I_o \text{ of pilots in the candidate and neighbor sets}\} \quad \text{Eq (3)}$$

This embodiment gives preference to the base stations in the active set.

In yet another embodiment, the Switch metric is defined as follows:

$$\text{Switch metric} = \text{Max}\{\text{sum of } E_c/I_o \text{ of all pilots in the active set, } E_c/I_o \text{ of pilots in the candidate and neighbor sets}\} \quad \text{Eq (4)}$$

The Switch metric may also be defined in other manners, and this is within the scope of the invention. Moreover, the Switch metric may be computed based on the SNRs for pilots received from base stations in any one set or any combination of sets. For example, the Switch metric may be computed based only on SNRs for (1) pilots received from base stations in the active set, or (2) only on pilots received from base stations in the active and candidate sets. If a particular set is not used in the computation of the Switch metric, then that set may be viewed as an empty set.

For the first scheme, base stations may be added to and removed from each of the three sets in the normal manner defined by the system. The Switch metric may be computed, periodically (e.g., whenever pilot measurements are available) or as needed, based on the SNR of the pilots received by the terminal. The Switch metric may then be used along with a Switch threshold to determine whether or not the terminal is within the coverage of the system.

A Switch timer may also be used to provide hysteresis so that the terminal does not intermittently determine that it is in-coverage/out-of-coverage due to fluctuations in SNR measurements. For example, the terminal may be deemed to be outside the coverage of the system if the Switch metric is below the Switch threshold for the Switch timer duration.

Figure 2:
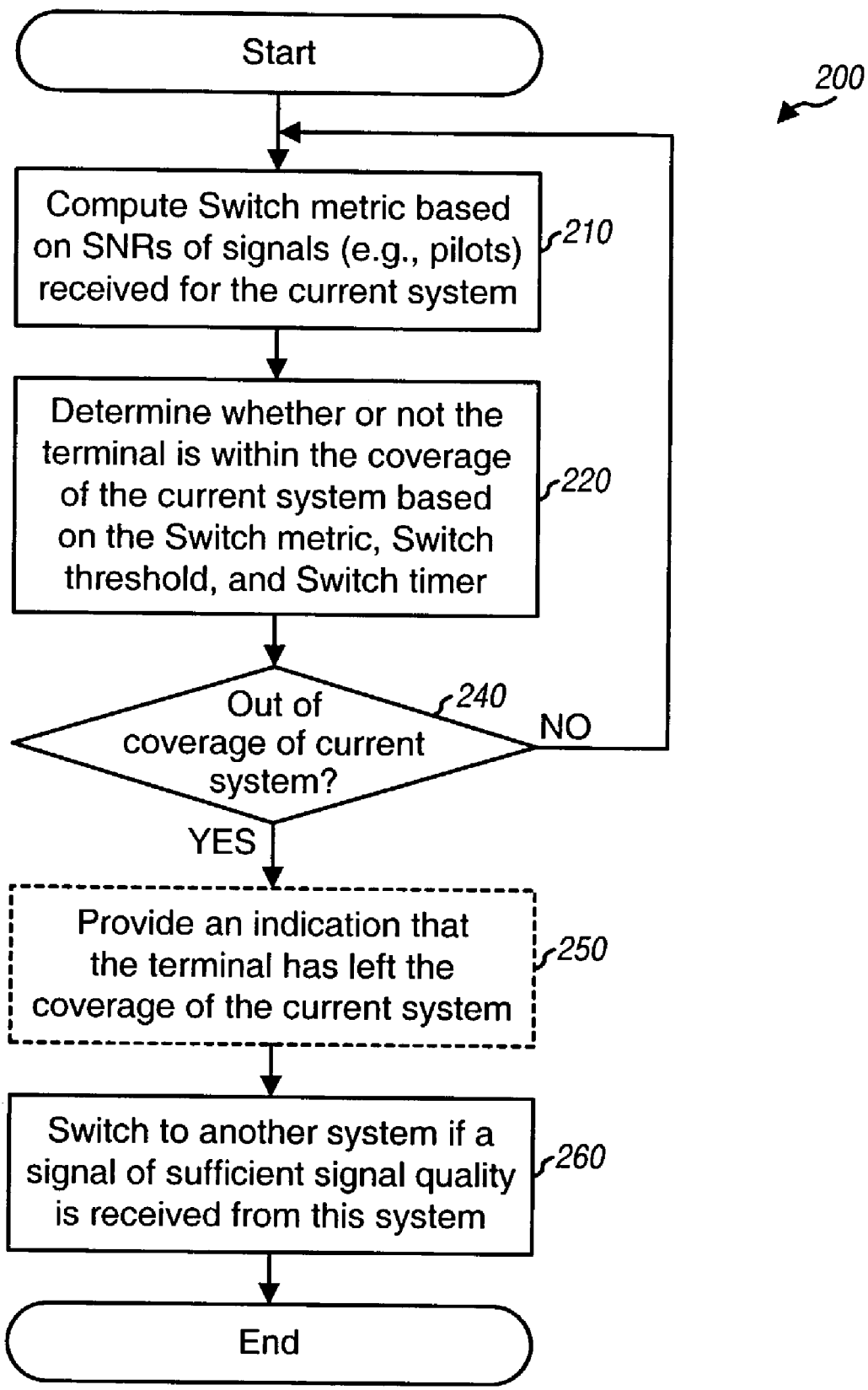
FIGS. 2 and 3 show a process for determining coverage bounds of the current system and for switching to another system.

FIG. 2 shows a flow diagram of an embodiment of a process 200 for determining coverage bounds of the current system (e.g., the packet data system) and for switching to another system (e.g., the voice/data system) in accordance with the first scheme. Initially, the Switch metric is computed based on the SNR of signals (e.g., pilots) received by the terminal from base stations in the current system (step 210). This Switch metric may be computed in various manners, as described above. A determination of whether or not the terminal is still within the coverage of the current system may then be made based on the Switch metric, Switch threshold, and Switch timer (step 220). An implementation of step 220 is described in FIG. 3 below. Steps 210 and 220 may be performed periodically or whenever SNR measurements are available.

If the terminal is within the coverage of the current system, as determined in step 240, then the process returns to step 210. Otherwise, an indication that the terminal has left the coverage of the current system may optionally be provided (step 250, shown by the dashed box). The terminal may then switch to another system (e.g., the voice/data system), if a signal or pilot of sufficient SNR is received from this other system, or may look for an alternative system (step 260). The process then terminates.

Figure 3:
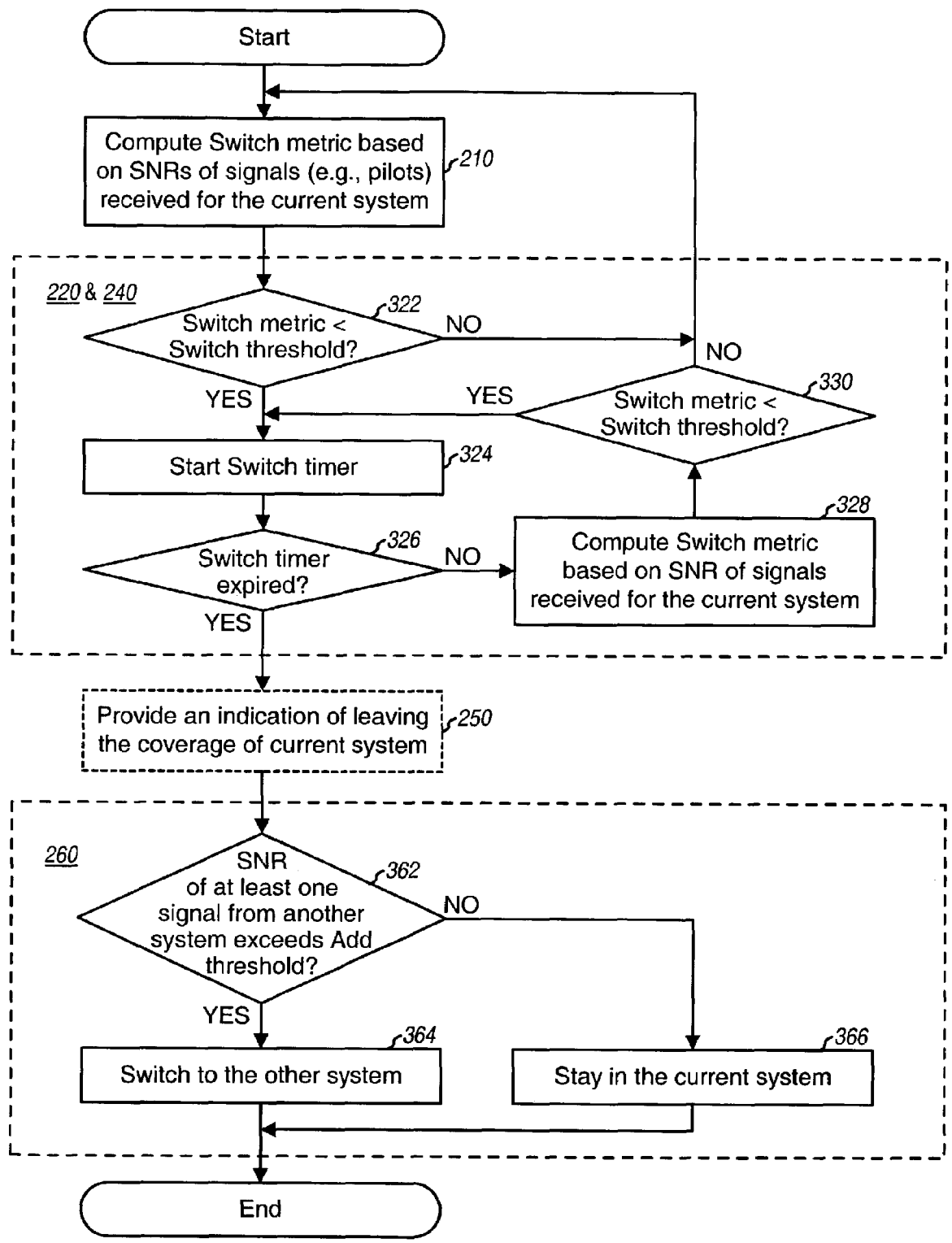

FIG. 3 shows a flow diagram of a specific implementation of process 200 in FIG. 2. In this implementation, the Switch metric is first computed as described above (step 210). For steps 220 and 240, a determination is initially made whether or not the Switch metric is below the Switch threshold (step 322). If the answer is no, then the terminal is still within the coverage of the current system and the process returns to step 210.

Otherwise, if the Switch metric is below the Switch threshold as determined in step 322, then the Switch timer is started (step 324). Thereafter, a determination is periodically made whether or not the Switch timer has expired (step 326). If the answer is no, then the Switch metric is computed for the current time instant based on current SNR measurements (step 328), and a determination is again made whether or not the newly computed Switch metric is still below the Switch threshold (step 230). If the answer is yes, then the process returns to step 324. In this implementation, if the Switch metric rises above the Switch threshold at any time prior to the expiration of the Switch timer (i.e., the answer to step 230 is no), then the terminal is deemed to be within the coverage of the current system and the process returns to step 210.

Otherwise, if the Switch metric remains below the Switch threshold for the entire Switch timer duration (i.e., the outcome of step 326 is yes), then an indication that the terminal has left the coverage of the current system may optionally be provided (step 250).

It is typically desirable to switch to another system only if at least one usable pilot is received from this system. This requirement avoids the condition whereby a terminal switches to another system when it temporarily losses coverage with the current system (e.g., upon entering an elevator) and signals from neither the packet data system nor voice/data system are received. Thus, to switch to another system (e.g., the voice/data system) in step 260, a determination is first made whether or not the SNR of at least one signal or pilot received from another system exceeds the Add threshold (step 362). If the answer is yes, then the terminal switches to this other system (step 364). Otherwise, the terminal remains in the current system (step 366). Although not shown in FIG. 3 for simplicity, after step 366, the terminal may (1) periodically compute the Switch metric, (2) return to step 210 if the Switch metric exceeds the Switch threshold, and (3) return to step 362 if the Switch metric continues to be below the Switch threshold. The process terminates after step 260.

The first scheme described above represent a specific and exemplary embodiment. Various other schemes may also be devised to determine the coverage bounds of a system and to switch between two overlay systems. These schemes may be implemented based on one or more of the following:

a metric (denoted as f);
a metric threshold (denoted as g); and
a timer (denoted as h).

Other factors may also be considered, and this is within the scope of the invention.

The metric f may be a parameter or a function of one or more parameters. Examples of parameters that may be used for the metric include (1) SNRs of signals (e.g., pilots) received from base stations, and (2) error rate of overhead signaling received from base stations. An exemplary function for the metric is the Switch metric in the first scheme, which is a function of SNRs of signals received from base stations in multiple sets.

The metric may be used directly or indirectly to determine (1) whether or not the terminal is within the coverage of the current system and/or (2) whether or not to switch from the current system to another system. For example, the Switch metric of the first scheme is used directly to determine coverage.

The metric threshold g may be a fixed value or an adaptive value that is dependent on operating condition. For example, the metric threshold may be based on (1) the number of base stations in the active set, candidate set, and/or neighbor set, (2) the measurements for the parameter(s) used to compute the metric, and so on. The metric threshold may also be derived based on measurements obtained for another system. For example, the metric f may be a function of SNRs of signals received from base stations in the current system (e.g., the packet data system) and the metric threshold may be a function of SNRs of signals received from base stations in another system (e.g., the voice/data system). Coverage for the terminal may then be determined as follows:

$$f(SNR_{pds}) > g(SNR_{vds}), \qquad \text{Eq (5)}$$

where $SNR_{vds}$ denotes the SNRs of base stations in the voice/data system;
$SNR_{pds}$ denotes the SNRs of base stations in the packet data system; and
f and g are different functions.

In general, the metric threshold is selected such that (1) the coverage bounds of the current system may be accurately determined and/or (2) the terminal does not switch from the current system too early or too late.

The timer h may be used to provide hysteresis so that (1) the terminal does not intermittently indicate that it is within and outside the coverage of the current system and (2) an out-of-coverage indication is not erroneously declared too frequently because of noisy measurements. The timer may be for a fixed duration or a variable duration that is dependent on operating condition. The timer may be selected to be as short as possible while achieving a particular rate of false indication (i.e., erroneously indicating out-of-coverage when such is not the case). It is also not necessary to use the timer (i.e., the timer may be set to zero). The hysteresis may also be provided by other means instead of the timer, or may simply be omitted altogether.

As an example, for the first scheme, the metric may be a function of only parameter values obtained for base stations in the active set (i.e., f(ASET)), a function of parameter values obtained for base stations in the active and candidate sets (i.e., f(ASET, CSET)), or a function of parameter values obtained for base stations in all three sets (i.e., f(ASET, CSET, NSET)). The metric threshold may be a fixed value (i.e., g), a function of parameter values for the active set (i.e., g(ASET)), and so on. Similarly, the timer may be a fixed value (i.e., h), a function of parameter values for the active set (i.e., h(ASET)), and so on.

Figure 4A:
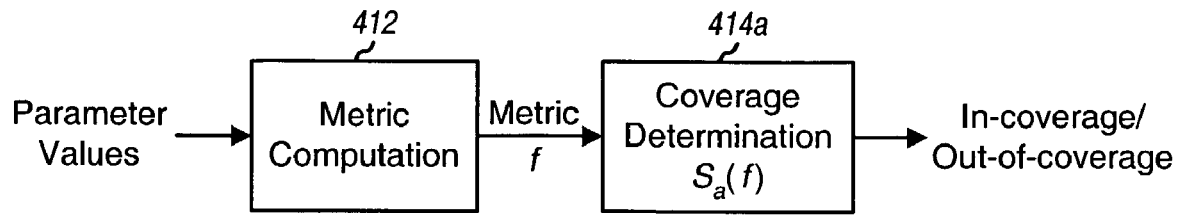
FIGS. 4A through 4C show simple block diagrams illustrating the determination of coverage for the terminal in overlay systems.
Figure 4B:
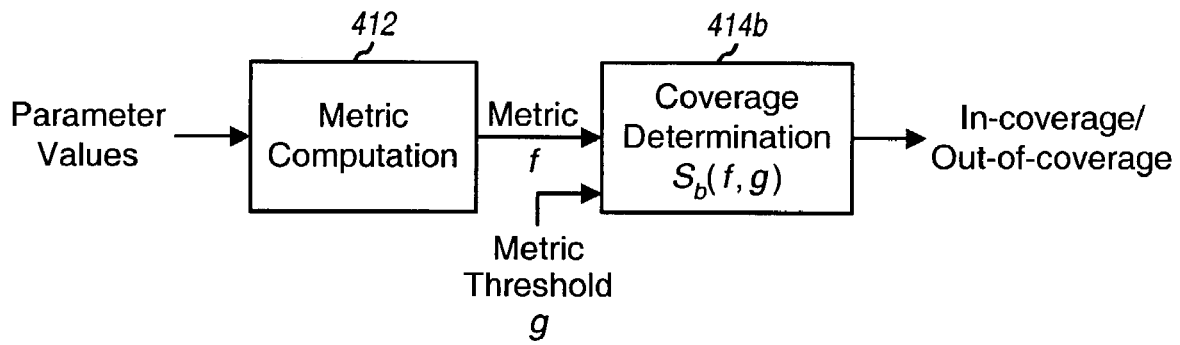
Figure 4C:
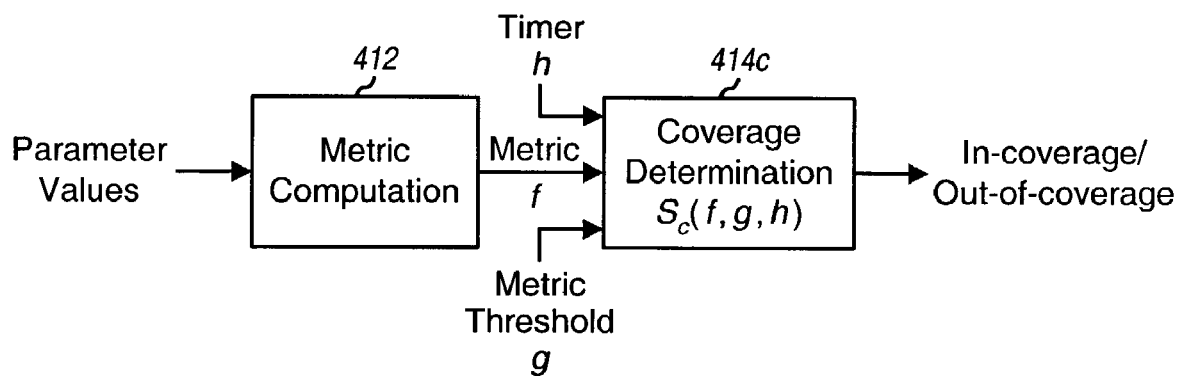

FIGS. 4A through 4C show simple block diagrams illustrating the determination of coverage for the terminal in overlay systems. In FIG. 4A, values for one or more parameters are provided to and used by a metric computation unit 412 to compute the metric f. The parameter(s) may be SNR for signals received from base stations in the current system (and possibly other systems). The metric f is then provided to and used by a coverage determination unit 414a to determine whether or not the terminal is within the coverage of the current system. In FIG. 4A, unit 414a determines coverage based on a function $S_a(f)$ of only the metric f. Unit 414a provides an indication of either in-coverage or out-of-coverage, which may be used to initiate a switch from the current system to another system.

In FIG. 4B, the metric f and the metric threshold g are provided to and used by a coverage determination unit 414b, which determines coverage based on a function $S_b(f, g)$ of both the metric f and the metric threshold g. Unit 414b also provides an indication of either in-coverage or out-of-coverage.

In FIG. 4C, the metric f, the metric threshold g, and the timer h are provided to a coverage determination unit 414c, which determines coverage based on a function $S_c(f, g, h)$ of all three quantities f, g, and h. Unit 414c also provides an indication of either in-coverage or out-of-coverage.

The metric, metric threshold, and/or timer may be provisioned at the terminal during manufacturing, when activated, or at some other time. Alternatively, the metric, metric threshold, and/or timer may be provided to the terminal via over-the-air signaling or by some other means.

The switch between overlay systems may also be performed based on other considerations such as, for example, the coverage areas of these systems, the types of services being provided by the systems, and so on. As shown in FIG. 1, the coverage area of the packet data system may be different and/or smaller than the coverage area of the voice/data system. In this case, the switch from the packet data system to the voice/data system may be based on one scheme (e.g., the first scheme described above) and the switch from the voice/data system to the packet data system may be based on another scheme.

In a second scheme for switching between overlay systems, the switch from the voice/data system to the packet data system may be based on one or more of the following:
  the preferred system for the terminal;
  the operating state of the terminal;
  the coverage obtained by the terminal; and
  the current data requirements of the terminal.

Other criteria may also be considered, and this is within the scope of the invention.

In general, the terminal should switch to and remain with the preferred system whenever possible. If the terminal is under the coverage of the voice/data system but the packet data system is configured as the preferred system for packet data transmission, then the terminal should switch back to the packet data system when appropriate, as determined based on one or more criteria described below.

As one criterion, the switch back to the packet data system may be dependent on the current operating state of the terminal. If the terminal is currently receiving service from the voice/data system, then switching to the packet data system at this time may cause disruption or disconnection of the service currently being received by the terminal. Thus, the terminal may wait until it is in a dormant state (i.e., not receiving any service from the voice/data system) before switching to the packet data system. For an IS-2000 system, the switch may be performed if the packet data service option for the terminal is in the dormant state.

As another criterion, the switch back to the packet data system may be initiated only if the terminal is under the coverage of the packet data system. This condition may be true, for example, if the SNR of signal received from at least one base station in the packet data system is above the Add threshold.

As yet another criterion, the switch back to the packet data system may be performed only if the terminal has data to send or is directed to switch, for example, by overhead signaling. If the terminal switches to the packet data system when it is idle and has no data to send, then it may be required to monitor for overhead signaling from both systems. This would then consume more power and reduce standby time, both of which are undesirable.

The two schemes used for switching from the packet data system to the voice/data system and vice versa may thus be defined to achieve the desired results. If the terminal is in an idle state, then the switch from the packet data system to the voice/data system may be desirable to reduce the probability of the terminal running into difficulty in accessing a system when it needs to, and to reduce battery consumption (because otherwise the terminal would need to monitor two paging channels). If the terminal is in a connected state (i.e., on a traffic channel), then the switch from the packet data system to the voice/data system may be desirable at the edge of coverage to ensure that the terminal operates in the better air-interface of the voice/data system without lingering on the degraded air-interface of the packet data system. The switch from the voice/data system to the packet data system may be desirable to obtain higher performance for packet data transmission.

Figure 5:
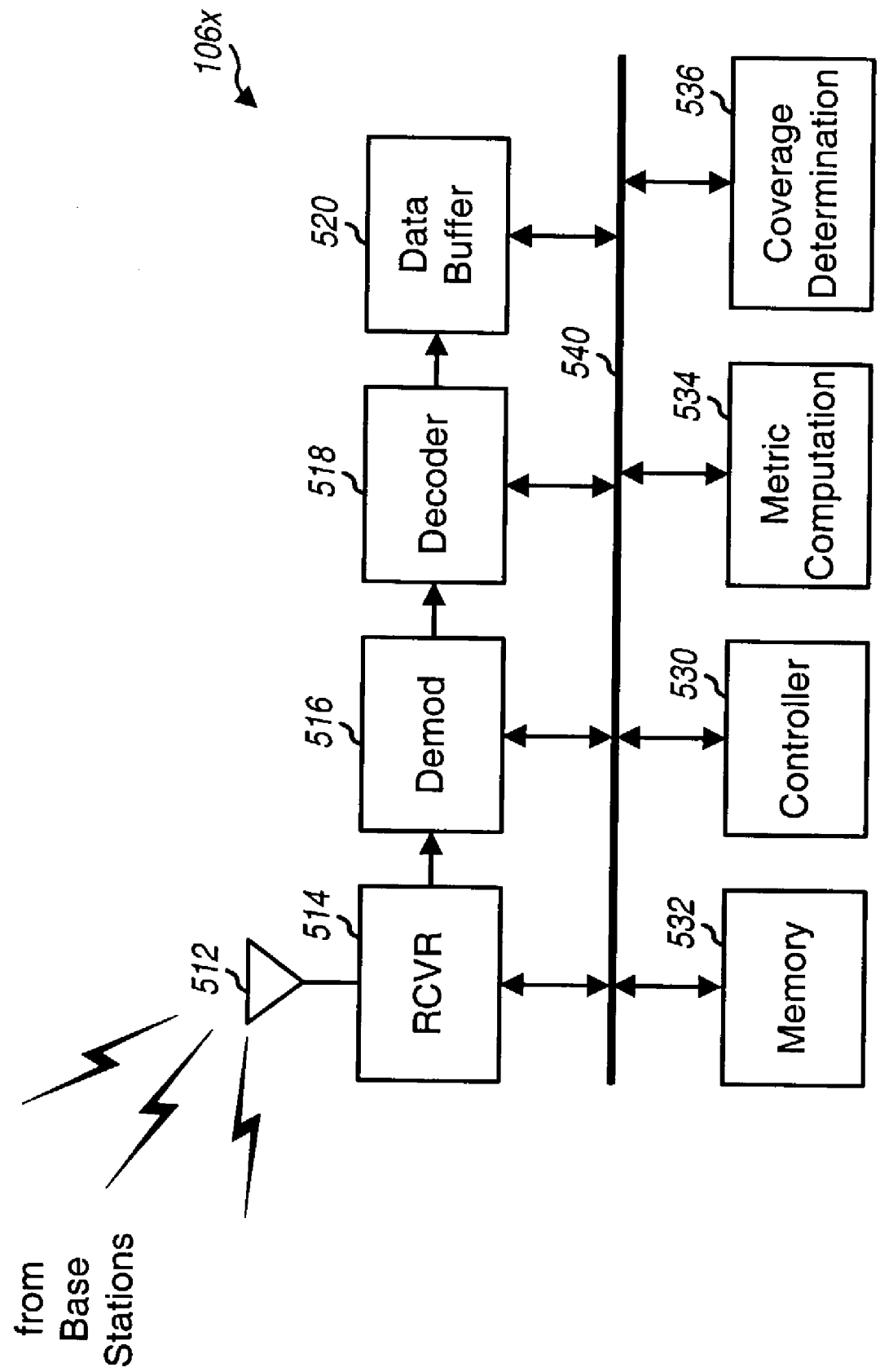
FIG. 5 shows a block diagram of a terminal capable of communicating with multiple communication systems.

FIG. 5 shows a block diagram of an embodiment of a terminal 106x capable of communicating with multiple communication systems. Terminal 106x may be any one of the terminals shown in FIG. 1, and may be a cellular phone, a handset, a wireless device, a modem, or some other device or design.

At terminal 106x, the forward link signals transmitted by the base stations in multiple systems are received by an antenna 512 and provided to a receiver unit (RCVR) 514. The received signal from antenna 512 typically includes one or more instances of the forward link signal transmitted by each of multiple base stations. Receiver unit 514 conditions (e.g., filters, amplifies, and frequency downconverts) the received signal and digitizes the conditioned signal to provide data samples.

A demodulator (Demod) 516 then processes the data samples in accordance with the systems being received. Demodulator 516 may implement a rake receiver that is capable of processing multiple signal instances in the received signal to obtain pilot estimates and demodulated symbols for each of one or multiple base stations. For a CDMA system, the processing by demodulator 516 to obtain pilot estimates for a particular base station may include (1) despreading the data samples with a pseudo-random noise (PN) sequence assigned to the base station being recovered, (2) decovering the despread samples with a channelization code for the pilot channel, and (3) filtering the decovered pilot symbols to provide the pilot estimates. For a CDMA system, the processing by demodulator 516 to obtain demodulated symbols for a particular base station may include (1) despreading the data samples with the PN sequence assigned to the base station being recovered, (2) decovering the despread samples with a channelization code for each traffic channel being recovered, and (3) data demodulating the decovered symbols with the pilot estimates to obtain the demodulated symbols, which are estimates of the symbols transmitted by the base stations. A decoder 518 further processes (e.g., deinterleaves and decodes) the demodulated symbols to provide decoded data, which may be stored in a data buffer 520.

Demodulator 516 and/or a controller 530 may further process the pilot estimates for each received base station to determine the SNR for the base station. Demodulator 516 and/or controller 530 may further process the pilot estimates or demodulated symbols for each received base station to estimate the SNR for the base station. The SNRs for one or multiple base stations may be used by a metric computation unit 534 to compute the metric. The metric, metric threshold, and timer may be used by a coverage determination unit 536 to determine whether the terminal is within or outside the coverage of each of multiple systems. The in-coverage/out-of-coverage indication provided by unit 536 may be used (possibly along with other information) to initiate a switch between overlay systems.

Controller 530 may direct the operation of various processing units within terminal 106x. Controller 530 may also be designed to implement units 534 and 536. Memory unit 532 may store data and program codes used by various processing units within terminal 106*x*. A bus 540 may be used to provide the interface between various processing units within terminal 106*x*.

The techniques described herein to determine coverage and to switch between overlay systems may be used for various systems. In general, these techniques may be used to switch between any two systems capable of providing the same type of service (e.g., packet data). For example, these techniques may be used to switch between (1) cdma2000 and IS-856 systems, (2) cdma2000 and GSM/GPRS systems, (3) cdma2000 and W-CDMA systems, (4) W-CDMA and GSM/GPRS systems, and so on.

The techniques described herein may be implemented by various means. For example, these techniques may be implemented in hardware, software, or a combination thereof. For a hardware implementation, the elements used to determine coverage and/or initiate the switch between overlay systems may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in a memory unit (e.g., memory unit 532 in FIG. 5) and executed by a processor (e.g., controller 530). The memory unit may be implemented within the processor or external to the processor, in which case it may be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of switching a terminal from a first wireless cdma communication system to a second cdma wireless communication system, comprising:
   obtaining at least one measurement of at least one parameter for at least one base station in the first cdma communication system;
   deriving a metric based on the at least one measurement;
   determining whether or not the terminal is within coverage of the first cdma communication system based on the metric; and
   initiating a switch to the second cdma communication system if the terminal is deemed to be outside the coverage of the first cdma communication system, wherein said metric is derived using one of the following formulae:
   (a) metric=Sum of $E_C/I_0$ of all pilots in the active and candidate sets and Max $\{E_C/I_0$ of pilots in the neighbor sets$\}$, wherein said $E_C$ represents energy-per-chip, and $I_0$ represents noise and interference,
   (b) metric=Sum of $E_C/I_0$ of all pilots in the active set and Max $\{E_C/I_0$ of pilots in the candidate and neighbor sets$\}$, wherein said $E_C$ represents energy-per-chip, and $I_0$ represents noise and interference,
   (c) metric=Max $\{$sum of $E_C/I_0$ of pilots in the active set, $E_C/I_0$ of pilots in the candidate and neighbor sets$\}$, wherein said $E_C$ represents energy-per-chip, and $I_0$ represents noise and interference, and
   (d) metric=Max $\{E_C/I_0$ of pilots in the active, candidate and neighbor sets$\}$, wherein said $E_C$ represents energy-per-chip, and $I_0$ represents noise and interference.

2. The method of claim 1, wherein the switch to the second cdma communication system is initiated only if at least one signal of sufficient signal quality is received from the second cdma communication system.

3. The method of claim 1, wherein the metric is derived based on quality of signals received by the terminal from base stations in the first cdma communication system.

4. The method of claim 1, wherein the metric is derived based on quality of signals received by the terminal from base stations in one or more sets selected from an active set, a candidate set, and a neighbor set.

5. The method of claim 1, wherein the determining is further based on a metric threshold.

6. The method of claim 5, wherein the metric threshold is a fixed value.

7. The method of claim 5, wherein the metric threshold is an adaptive value.

8. The method of claim 5, wherein the metric threshold is determined based on one or more measurements obtained for the second cdma communication system.

9. The method of claim 5, wherein the determining is further based on a timer.

10. The method of claim 9, wherein the terminal is deemed to be outside the coverage of the first cdma communication system if the metric is below the metric threshold for the duration of the timer.

11. The method of claim 10, wherein the timer duration is an adaptive value.

12. The method of claim 11, wherein the timer duration is determined based on one or more measurements obtained for the first cdma communication system.

13. The method of claim 1, wherein the switch is initiated only if at least one base station in the second cdma communication system is received by the terminal with sufficient signal quality.

14. The method of claim 1, wherein the first and second cdma communication systems provide at least one common service.

15. The method of claim 1, wherein the at least one common service includes packet data service.

16. The method of claim 1, wherein the first cdma communication system is an IS-856 system and the second cdma communication system is a cdma2000 system.

17. The method of claim 1, wherein said metric is derived based on a sum of the at least one signal quality measurement.

18. The method of claim 1, wherein said metric is derived based on a maximum of the at least one signal quality measurement.

19. The method according to claim 1, wherein said metric is derived based on a maximum and a sum of a signal-to-noise ratio of the at least one measurement of at least one pilot in active, candidate and neighbor sets.

20. A terminal comprising:
   a metric computation unit operative to receive at least one measurement of at least one parameter for at least one base station in a first cdma wireless communication system and to derive a metric based on the at least one measurement;

a coverage determination unit operative to determine whether or not the terminal is within coverage of the first cdma communication system based on the metric; and a controller operative to initiate a switch to a cdma second wireless communication system if the terminal is deemed to be outside the coverage of the first cdma communication system, wherein said metric is derived using one of the following formulae:

(a) metric=Sum of $E_C/I_0$ of all pilots in the active and candidate sets and Max {I $E_C/I_0$ of pilots in the neighbor sets}. wherein said $E_C$ represents energy-per-chip, and $I_0$ represents noise and interference, (b) metric=Sum of $E_C/I_0$ of all pilots in the active set and Max {$E_C/I_0$ of pilots in the candidate and neighbor sets}, wherein said $E_C$ represents energy-per-chip, and $I_0$ represents noise and interference (c) metric=Max {sum of $E_C/I_0$ of pilots in the active set, $E_C/I_0$ of pilots in the candidate and neighbor sets}. wherein said $E_C$ represents energy-per-chip, and $I_0$ represents noise and interference, and (d) metric=Max {$E_C/I_0$ of pilots in the active, candidate and neighbor sets}, wherein said $E_C$ represents energy-per-chip, and $I_0$ represents noise and interference.

21. The terminal of claim 20, wherein the metric relates to an active set that includes base stations in the first cdma communication system received by the terminal with sufficient signal quality.

22. The terminal of claim 20, wherein the metric is derived based on quality of signals received by the terminal from base stations in one or more sets selected from an active set, a candidate set, and a neighbor set.

23. The terminal of claim 20, wherein said metric is derived based on a sum of the at least one measurement.

24. The terminal of claim 20, wherein said metric is derived based on a maximum of the at least one measurement.

25. The terminal according to claim 20, wherein said metric is derived based on a maximum and a sum of a signal-to-noise ratio of the at least one measurement of at least one pilot in active, candidate and neighbor sets.

26. An apparatus comprising:

means for obtaining at least one measurement of at least one parameter for at least one base station in a first cdma wireless communication system;

means for deriving a metric based on the at least one measurement;

means for determining whether or not the terminal is within coverage of the first cdma communication system based on the metric; and means for initiating a switch to a second wireless communication system if the terminal is deemed to be outside the coverage of the first cdma communication system, wherein said metric is derived using one of the following formulae:

(a) metric=Sum of $E_C/I_0$ of all pilots in the active and candidate sets and Max {$E_C/I_0$ of pilots in the neighbor sets}, wherein said $E_C$ represents energy-per-chip, and $I_0$ represents noise and interference, (b) metric=Sum of $E_C/I_0$ of all pilots in the active set and Max {$E_C/I_0$ of pilots in the candidate and neighbor sets}, wherein said $E_C$ represents energy-per-chip, and $I_0$ represents noise and interference (c) metric=Max {sum of $E_C/I_0$ of pilots in the active set, $E_C/I_0$ of pilots in the candidate and neighbor sets}, wherein said $E_C$ represents energy-per-chip, and $I_0$ represents noise and interference, and (d) metric=Max {$E_C/I_0$ of pilots in the active, candidate and neighbor sets}, wherein said $E_C$ represents energy-per-chip, and $I_0$ represents noise and interference.

27. The apparatus of claim 26, wherein said metric s derived based on a sum of the at least one measurement.

28. The apparatus of claim 26, wherein said metric is derived based on a maximum of the at least one measurement.

29. The method according to claim 26, wherein said metric is derived based on a maximum and a sum of a signal-to-noise ratio of the at least one measurement of at least one pilot in active, candidate and neighbor sets.

30. A memory communicatively coupled to a digital signal processing device (DSPD) capable of interpreting digital information to:

receive at least one measurement of at least one parameter for at least one base station in a first cdma wireless communication system;

derive a metric based on the at least one measurement;

determine whether or not a terminal is within coverage of the first cdma communication system based on the metric; and initiate a switch to a second cdma wireless communication system if the terminal is deemed to be outside the coverage of the first cdma communication system, wherein said metric is derived using one of the following formulae:

(a) metric=Sum of $E_C/I_0$ of all pilots in the active and candidate sets and Max {$E_C/I_0$ of pilots in the neighbor sets}, wherein said $E_C$ represents energy-per-chip, and $I_0$ represents noise and interference, (b) metric=Sum of $E_C/I_0$ of all pilots in the active set and Max {$E_C/I_0$ of pilots in the candidate and neighbor sets}, wherein said $E_C$ represents energy-per-chip, and $I_0$ represents noise and interference, (c) metric=Max {sum of $E_C/I_0$ of pilots in the active set, $E_C/I_0$ of pilots in the candidate and neighbor sets}, wherein said $E_C$ represents energy-per-chip, and $I_0$ represents noise and interference, and (d) metric=Max {$E_C/I_0$ of pilots in the active, candidate and neighbor sets}, wherein said $E_C$ represents energy-per-chip, and $I_0$ represents noise and interference.

31. The memory of claim 30, wherein said metric s derived based on a sum of the at least one measurement.

32. The memory of claim 30, wherein said metric is derived based on a maximum of the at least one measurement.

33. The method according to claim 30, wherein said metric is derived based on a maximum and a sum of a signal-to-noise ratio of the at least one measurement of at least one pilot in active, candidate and neighbor sets.

34. A method of determining coverage for a terminal in a wireless communication system, comprising:

obtaining at least one signal quality measurement for at least one base station in the wireless communication system;

deriving a metric based on a maximum of the at least one signal quality measurement; and determining whether or not the terminal is within coverage of the wireless communication system based on the metric, wherein said metric is derived using one of the following formulae:

(a) metric=Sum of $E_C/I_0$ of all pilots in the active and candidate sets and Max {$E_C/I_0$ of pilots in the neighbor sets}, wherein said $E_C$ represents energy-per-chip, and $I_0$ represents noise and interference (b) metric=Max $E_C/I_0$ of pilots in the active, candidate and neighbor sets}, wherein said $E_C$ represents energy-per-chip, and $I_0$ represents noise and interference (c) metric=Sum of $E_C/I_0$ of all pilots in the active set and Max {$E_C/I_0$ of pilots in the candidate and neighbor sets}, wherein said $E_C$ represents energy-per-chip, and $I_0$ represents noise and interference, and (d) metric=Max sum of $E_C/I_0$ of pilots in the active set, $E_C/I_0$ of pilots in the candidate and neighbor sets}, wherein said $E_C$ represents energy-per-chip, and $I_0$ represents noise and interference.

35. The method of claim 34, wherein the metric is derived based on signal quality measurements for base stations in one or more sets selected from an active set, a candidate set, and a neighbor set.

36. The method of claim 34, wherein said step of deriving a metric based on a maximum of the at least one signal quality measurement further comprises deriving the metric based on a sum of the at least one signal quality measurement.

37. The method of claim 34, wherein said step of deriving a metric based on a maximum of the at least one signal quality measurement further comprises deriving said metric based on a maximum of a signal-to-noise ratio of at least one pilot in active, candidate and neighbor sets.

38. The method of claim 34, wherein the terminal is deemed to be outside the coverage of the wireless communication system if the metric is below a metric threshold for the duration of a timer.

* * * * *